R. H. H. HUNT.
LOOM.
APPLICATION FILED AUG. 3, 1896.

960,019.

Patented May 31, 1910.
10 SHEETS—SHEET 1.

WITNESSES:

INVENTOR
Robert H. H. Hunt
BY
Boone & Murdock
ATTORNEYS

R. H. H. HUNT.
LOOM.
APPLICATION FILED AUG. 3, 1896.

960,019.

Patented May 31, 1910.
10 SHEETS—SHEET 3.

WITNESSES:

INVENTOR

BY

ATTORNEYS

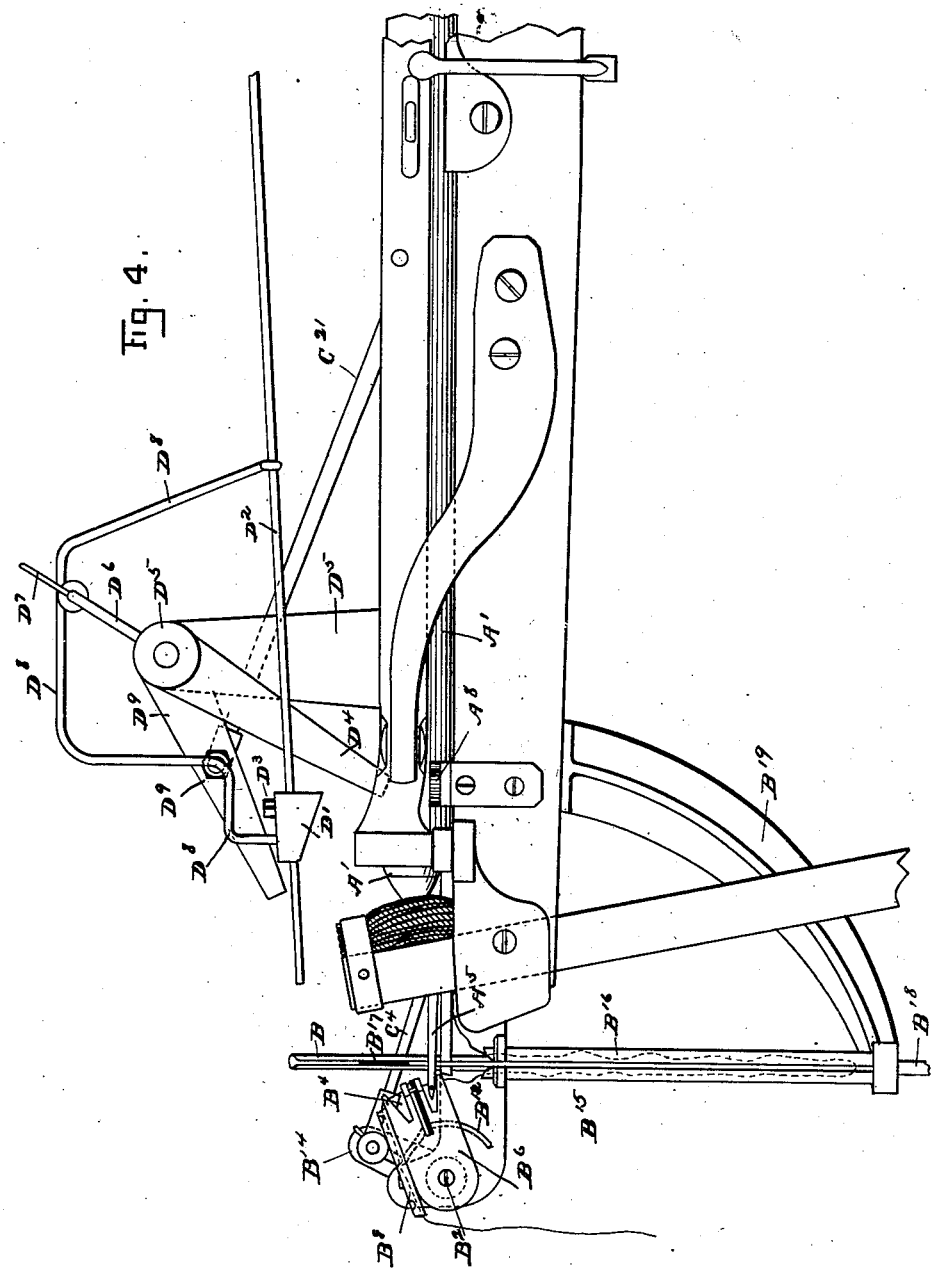

R. H. H. HUNT.
LOOM.
APPLICATION FILED AUG. 3, 1896.
960,019.
Patented May 31, 1910.
10 SHEETS—SHEET 5.
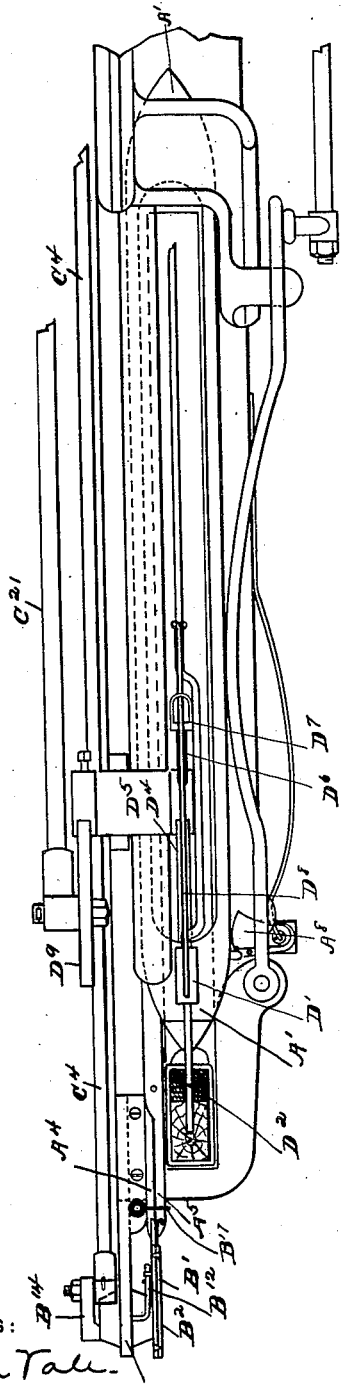
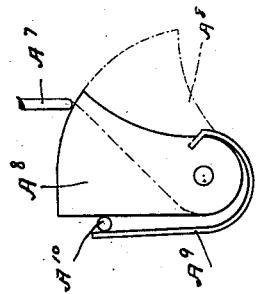
WITNESSES:
Baldwin Tall
Chas. J. Armbruster
INVENTOR
Robert H. H. Hunt
BY
Boone & Murdock
ATTORNEYS

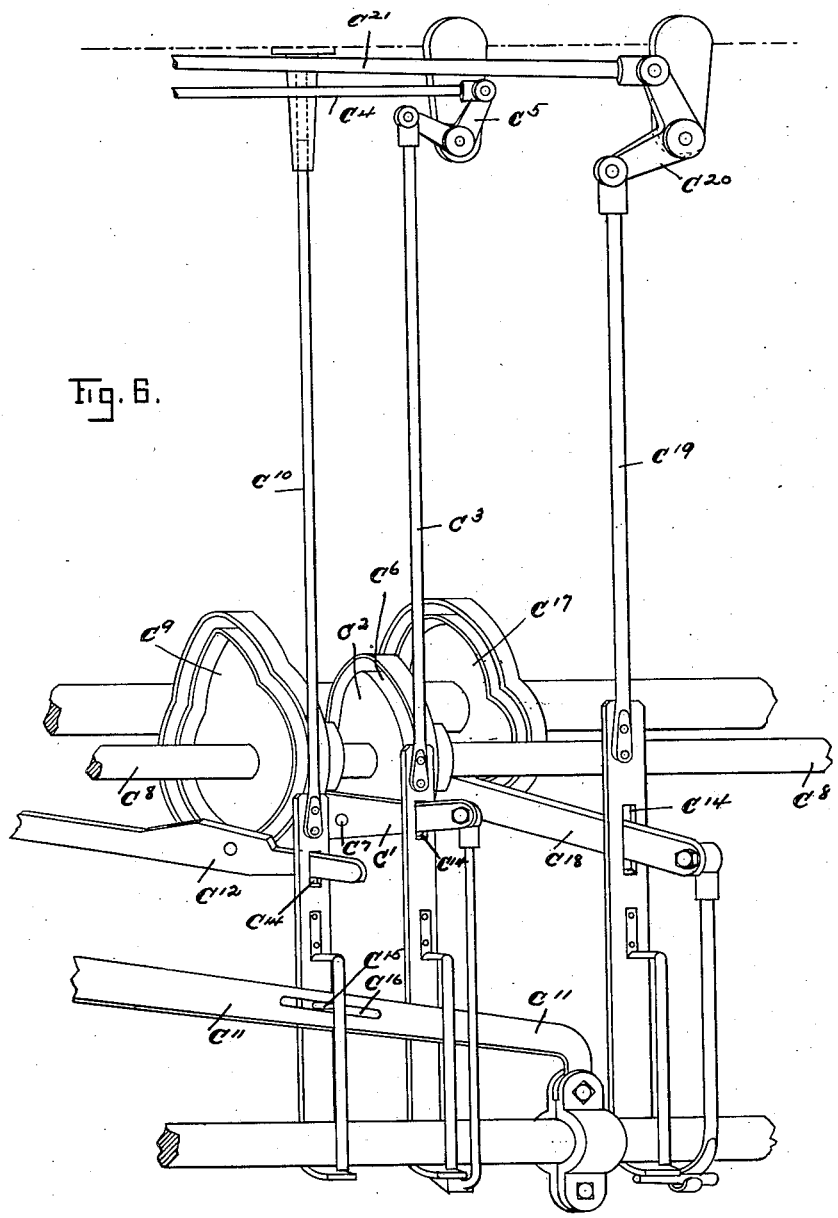

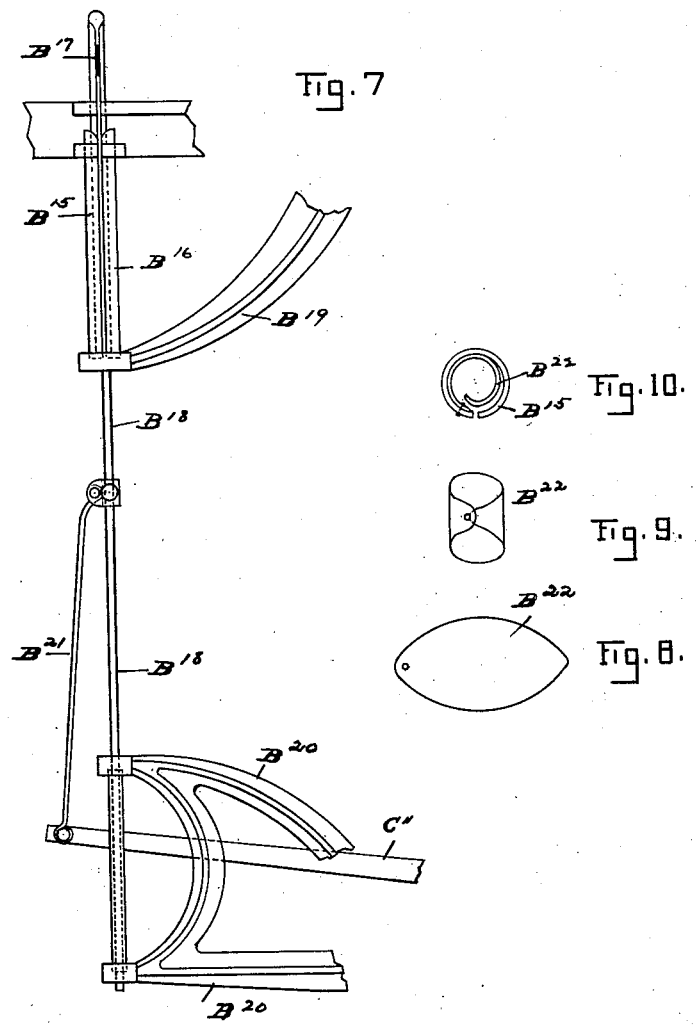

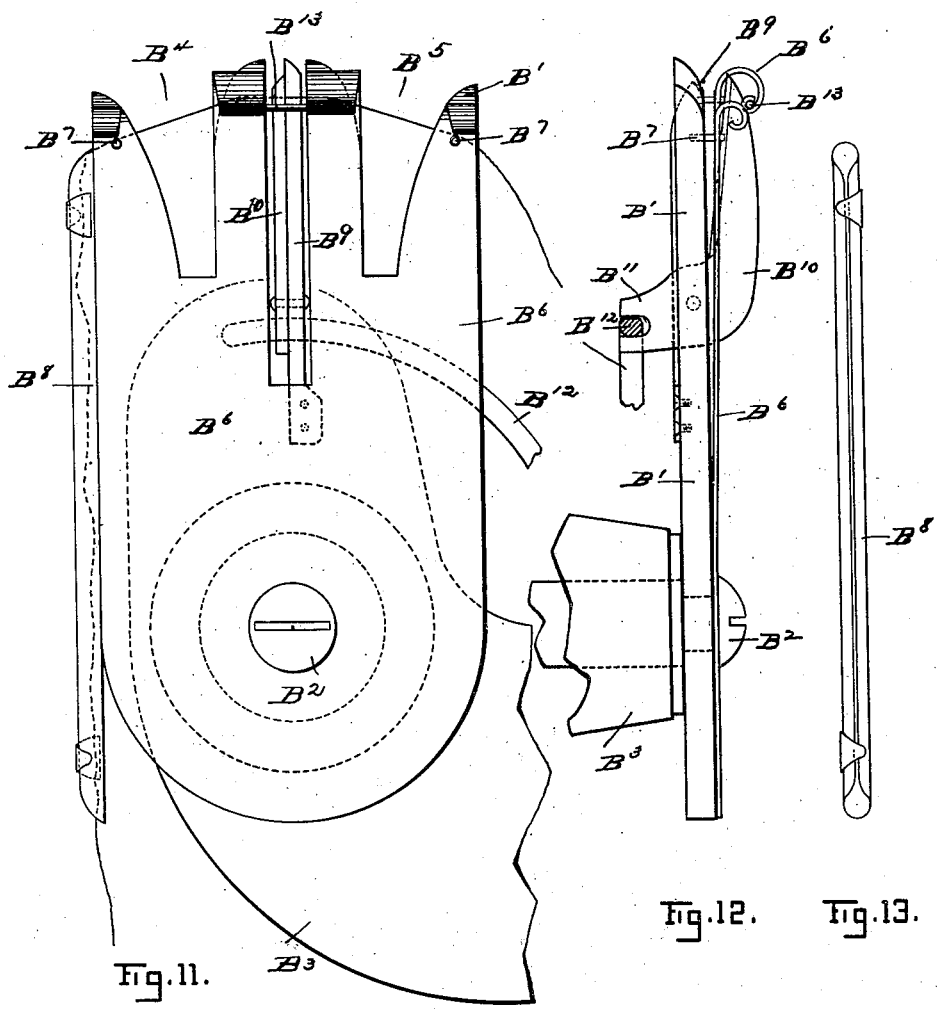

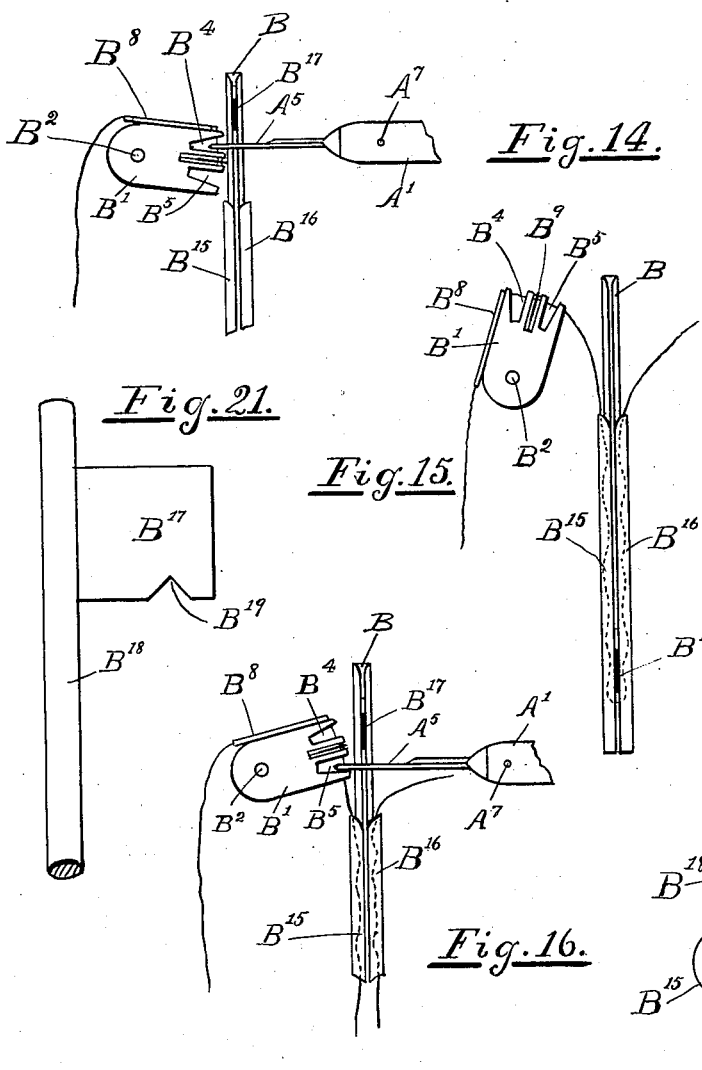

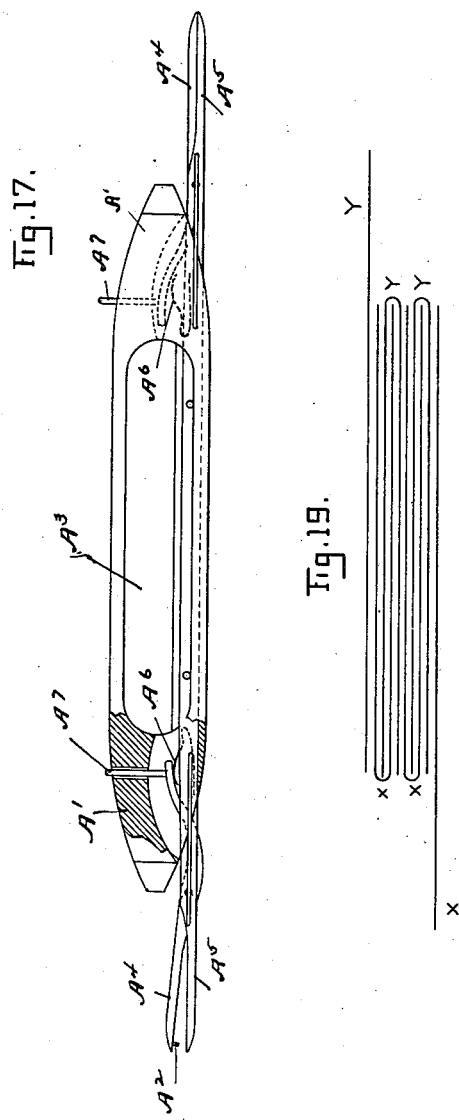

UNITED STATES PATENT OFFICE.

ROBERT H. H. HUNT, OF ALAMEDA, CALIFORNIA, ASSIGNOR TO ECONOMIC LOOM COMPANY, OF SAN FRANCISCO, CALIFORNIA, A CORPORATION OF CALIFORNIA.

LOOM.

960,019.

Specification of Letters Patent.

Patented May 31, 1910.

Application filed August 3, 1896. Serial No. 601,546.

*To all whom it may concern:*

Be it known that I, ROBERT H. H. HUNT, citizen of the United States, residing at Alameda, in the county of Alameda and State of California, have invented certain new and useful Improvements in Looms; and I do hereby declare the following to be a full, clear, and exact description of said invention, such as will enable others skilled in the art to which it most nearly appertains to make, use, and practice the same.

This invention relates to improvements in cloth weaving looms, and more particularly to that portion of the mechanism of same, by means of which the filling thread is laid in.

The class of fabrics for the manufacture of which this invention is particularly designed, is shown and described in a Patent No. 361,360, granted to me by the United States on the 19th day of April, 1887.

The principal advantages sought to be attained by this invention are: 1st, saving of waste of the material, incident to the present methods and machines, which waste is occasioned principally by the short lengths contained within the exhausted shuttles; 2nd, saving of time caused by stoppages of the loom occasioned by renewal of the successive filled shuttles; 3rd, saving of labor by eliminating the necessity of close inspection over the loom to note the exhaustion of the shuttle, and thereby increasing the number of machines possible for an operator to supervise; and 4th, the increased width of the fabric which it is possible to manufacture with a loom built and operated in accordance with this invention as pointed out in the claims.

Figure 1:
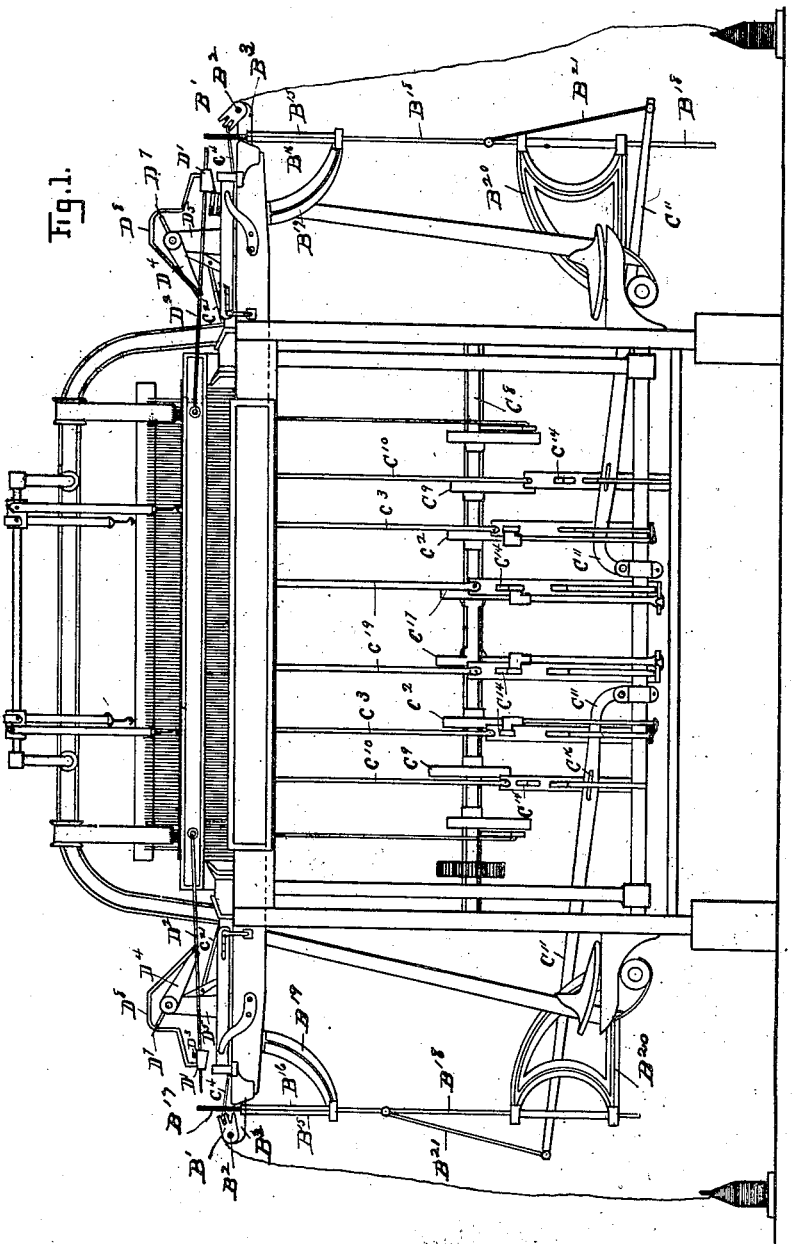
Figure 2:
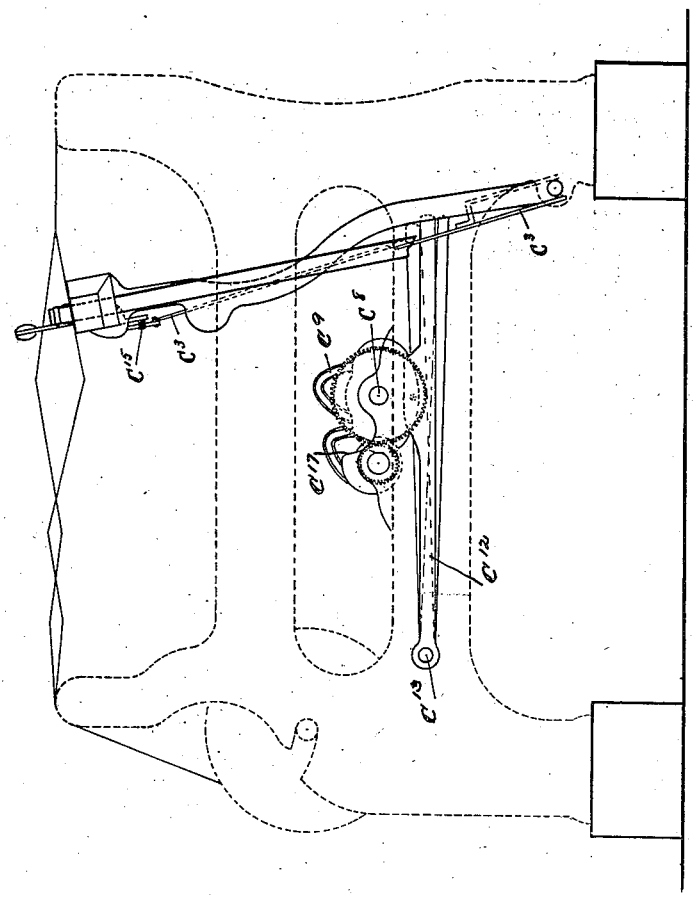
Figure 3:
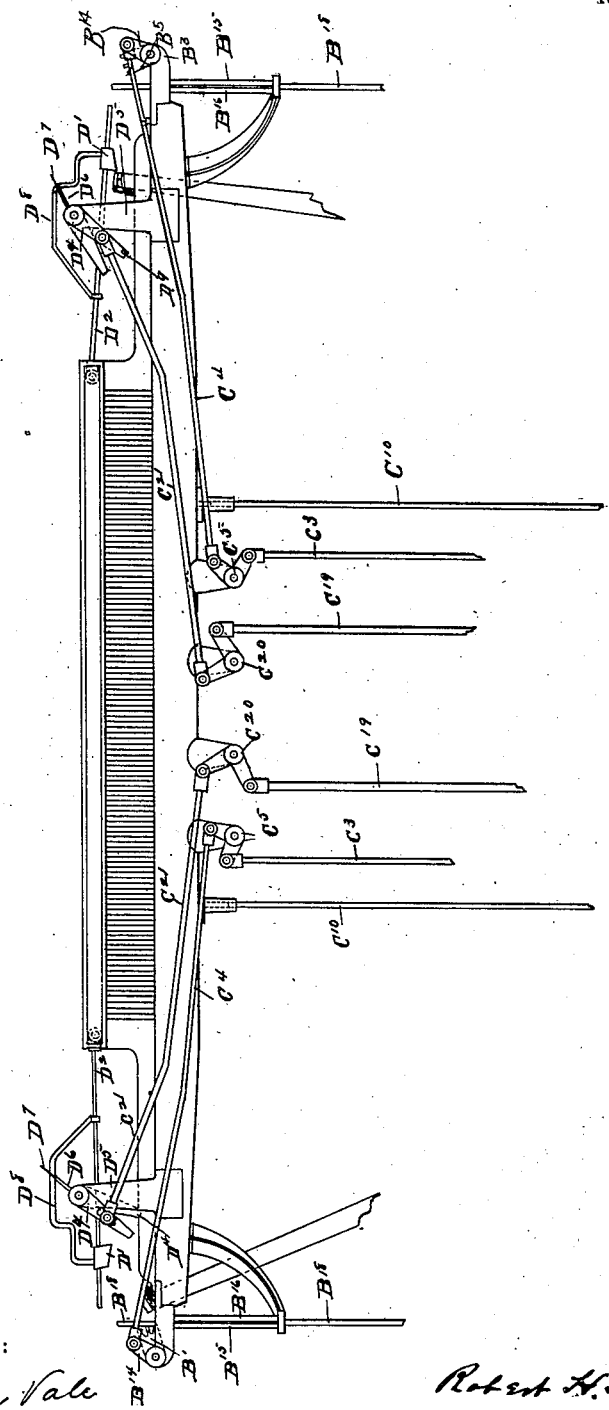

In the drawings:—Figure 1, is a front elevation of a loom provided with attachments in accordance with this invention; Fig. 2, is a side view of the invention, the dotted lines showing the construction as far as necessary for the purposes of illustration, of the frame of the ordinary loom; Fig. 3, is a rear elevation in detail of the lay of a loom provided with this invention, the parts being broken away, as shown; Fig. 4, is an enlarged detail view in front elevation of the left hand end of the lay shown in Fig. 1; Fig. 5, is a plan view of the end of the lay as shown in Fig. 4; Fig. 6, is a detail of the cam-operative mechanism by which the various attachments at one end of the loom are controlled and operated; Fig. 7, is a detail view in front elevation of what is hereinafter described as the measuring mechanism; Figs. 8, 9 and 10, are detail views of the thread straightening device employed in the measuring device shown in Fig. 7, the views showing in succession the different forms of the said device in the course of its construction; Fig. 11, is a detail view in front elevation of the feed plate and its attachments; Fig. 12, is a top view of the same; Fig. 13, is a detail of the thread guide-tube attachment to the feed plate; Figs. 14, 15 and 16, are detail views showing in diagram the three positions assumed by the said feed plate in delivering the thread to the carrying mechanism, the measuring mechanism and the end of the carrying mechanism being shown in conjunction therewith in Figs. 14 and 16; Fig. 17, is a detail view of the bottom of the thread carrier employed in this invention, the one end being part cut away to show the opening and closing devices for the nipper jaws; Fig. 18, is a detail view of the spring actuated cam, by means of which the nipper jaws are thrown open; Fig. 19, is a diagram of the filling threads as laid in, the warp threads being omitted. Fig. 20 is a plan or upper end view of the three tubes of the measuring device; Fig. 21 is a side view of the vane used in the measuring device.

To facilitate the description of this invention, with reference to the drawings, it is herein separated into its different elements, or instrumentalities, to each group of which there has been assigned a letter common to the various parts thereof. And to each member of the group has been given a distinguishing numeral in conjunction with the letter common to the group to which it belongs. Thus the carrying mechanism and each part thereof is designated by the letter, A, in common; the feed mechanism and each part thereof is designated by the letter, B, in common; the driving mechanism and each part thereof is designated by the letter, C, in common; and the controlling mechanism and each part thereof is designated by the letter, D, in common.

The distinctive feature of the method followed in the operation of this loom consists in the manner of laying in the filling threads, which are laid in in short lengths of thread extending once across the web and return; and in alternating these threads to cause each to bind or loop around the end of the one adjoining. And further in supplying these short lengths from unlimited supplies placed outside the loom and on either side thereof, which supplies may be renewed without stoppage of the loom.

To lay in the filling thread, as above described, it has to be prepared by forming it into threads of the desired length, as it is being laid in one half at a time. For this purpose the feeding mechanism is designed. This consists in devices to grasp and present the two ends successively of the lengths of thread to a carrying mechanism; in devices to measure the lengths; and in devices for cutting the thread when so measured. The first of these devices,—that to present the ends of the thread to the carrying mechanism,—consists of the plate, $B'$, pivotally mounted in bearing, $B^2$, provided in the brackets, $B^3$, at either end of the lay of the loom. The plate, $B'$, is provided in the outer, or free, edge with the openings, $B^4$, and $B^5$, into which the nipper jaws of the thread carrier extend to grasp the two ends successively of the lengths of thread, as they are held across the openings. To grasp the thread the plates, $B'$ are provided on their face with the spring jaws, $B^6$, which have openings in the outer edge corresponding with, $B^4$, and $B^5$, of the plate, $B'$. The spring jaw, $B^6$, is firmly attached to the plate, $B'$, near the pivotal bearing thereof, and the forward ends of the portions between the openings, $B^4$, and $B^5$, are curled outward and back to form guides to lead the thread between the plate $B'$ and said spring jaw, when the same is opened and shifting for a renewed grasp on the thread. To regulate the position of the thread in crossing the openings, $B^4$, $B^5$, the pins, $B^7$, are provided in the plate, $B'$, and extend through the jaw, $B^6$, to receive the thread when the jaw is opened and the plate raised for a renewed grasp on the thread. In its operation the plate, $B'$, is rotated to assume the three positions shown at Figs. 14, 15, 16, of drawings in the order shown. In the first position the end of the thread is taken from the opening, $B^4$, by the thread-carrier which starts across the lay to place it in position between the web threads. During the progress of the thread-carrier across the lay, as described, the plate, $B'$ is thrown upward in the second position, the thread being released from the grasp of the spring jaw and running freely through the guide tube, $B^8$. As the thread-carrier reaches the far side of the lay, the plate completes its upward movement, and the jaw, $B^6$, which has been held open, closes and grasps the thread. The plate is now rotated to the third position, presenting the opening, $B^5$, to the nipper jaws of the thread-carrier, when it is returned across the lay. In thus descending from the second to the third position, the thread is cut between the openings, $B^4$, and $B^5$, so that the thread-carrier takes the last end of the same length it has previously laid in, on its next flight across the lay.

It is to cut the thread, as above described, that the stationary and pivoted shear blades, $B^9$, and $B^{10}$, are provided, while the end of the pivoted blade, $B^{10}$, is further employed to lift the spring jaw, $B^6$, to receive the thread. The stationary blade is rigidly mounted in the plate, $B'$, as shown. The blade, $B^{10}$, is pivotally mounted on the fixed blade $B^9$, and is provided with the forked arm, $B^{11}$, by means of which it is operated. The tines of the forked arm straddle the bent rod, $B^{12}$, the bends of which are employed to operate the pivoted blade, $B^{10}$, by throwing the forked end of the arm, $B^{11}$, in and out from the center of the rotation of the plate. As the forked end of this arm is forced outward the blade, $B^{10}$, is raised away from the blade, $B^9$, and impinges upon and forces the spring jaw $B^6$, away from the plate, $B'$, to release or receive the thread. To receive the end of the blade, $B^{10}$, the ends of the spring jaw, which extends to either side of the blade, are bridged across by a small pin, $B^{13}$. When,—as in descending from the second to the third position,—the forked end of arm, $B^{11}$, is carried inward the blade, $B^{10}$, is depressed upon and past the blade, $B^9$, cutting the interposed thread in so passing. The operative mechanism by which the plate is rotated is attached to the crank arm, $B^{14}$, at the back of the bearings, $B^2$ on the farther side of the lay. As the various driving mechanisms for the various above-named mechanisms are in principle of construction the same, varying only in minor details, they will be all described at the same time hereinafter.

The plates, $B'$, and their attachments are in every respect the same at both ends of the lay. The only difference which exists in the different sets is in the time of their operation, this being arranged so that the positions of the plate, $B'$, and its attachments on the one side shall be successively duplicated on the other, that is to say, the first position, as above described, of the plate, $B'$, on the left of the lay, shall be assumed by the plate, $B'$, on the right of the lay when the thread-carrier reaches it after leaving the plate on the left side in that position, and so on through the whole operation. By this means is insured the binding the free ends of the short lengths of thread by the loop around the ends as above set forth as being the peculiarity of the selvage of the fabric.

In order that the lengths of thread may be uniform there has been provided a measuring device by means of which the threads are measured off the exact lengths before being cut by the cutting devices on the plates, B'. This measuring device consists of a vane B¹⁷ with a V notch B¹⁹ on its under side and is attached to a rod B¹⁸ and its operative mechanism which causes it to move up and down in a slotted tube B, Fig. 4, to depress the filling thread into a thread receptacle consisting of two slotted tubes B¹⁵ and B¹⁶. These slotted tubes are perpendicularly mounted as shown in Fig. 4 and stand triangularly to each other and with the slots facing inwardly with space sufficient between the tubes B¹⁵ and B¹⁶ to admit of the passage of the vane B¹⁷ between them as it descends in the act of measuring off and storing up a definite predetermined amount of thread in the tubes B¹⁵ and B¹⁶. The depression of the vane B¹⁷ takes place after the thread carrier has taken the thread from the opening B⁴ and made its flight to the opposite side of the loom and while the feeder plate is being rotated upward from the position shown in Fig. 14 to that shown in Fig. 15 and returns to its normal raised position above the path of the thread carrier as shown in Fig. 16 while the feeder plate is rotating downward from its raised position in Fig. 15 to that shown in Fig. 16. As the vane is raised the thread remains in the tubes until drawn out by the flight of the thread carrier. The vane is mounted rigidly on the rod, B¹⁸, which moves in a slotted guide tube B mounted in brackets, B¹⁹, and B²⁰, in which it is operated up and down by the driving mechanism provided for it and to which it is connected by the pivoted rod, B²¹. It is by raising and lowering the connection of the rod, B²¹, on the rod, B¹⁸, that variations are made in the lengths of the filling thread to accommodate various widths of fabric. The stroke of the driving mechanism is constant, therefore by raising the rod, B¹⁸, the vane, B¹⁷, will not be carried so low between the tubes, B¹⁵, and B¹⁶, and consequently the quantity of thread drawn past the opened plate, B', and spring jaw, B⁶, will be less than when the vane is drawn farther down. The thread having been deposited in the tubes, and the vane being raised, the plate, B', will be found in the position shown in Fig. 16 in which, as above set forth, it presents to the thread carrier the latter end of the cut lengths. The thread at this stage of the operation is in the position as follows: The first half of the length has been laid in and the shed of the warp has changed to bind it in position, the half of the length now to be laid in extends from the warp to and down the tube, B¹⁶, and across and up the tube, B¹⁵, to and across the opening, B⁵, in the plate, B', and spring jaw, B⁶, ready to be taken by the thread carrier and to be carried thereby across the lay. To compel the thread to carry straight and to take from it all tendency to crinkle or run into knots as it is withdrawn from the tubes, the tube, B¹⁵, is provided at its upper end with a straightening device which is a small curled piece of metal, B²². This straightening device is shown at Figs. 8, 9, 10, of drawings. In its present form it consists of a small piece of oval-shaped metal, the blank of which is shown at Fig. 8. This is curled upon itself, as shown in Figs. 9, 10, and is of slightly smaller diameter than the tube in which it is mounted. This mounting consists in riveting the one end of the curled piece to the tube so that the free end rests slightly to one side of the slot in the tube. When now the thread is depressed into the slotted tube, B¹⁵, it strikes upon the sloping end of the curled piece, B²², and passes it to fall behind the same. As the thread is now taken by the thread carrier and thereby withdrawn from the tubes it follows over the curled piece, the slight friction on which, maintains the thread straight. When the loop, which has been at the bottom of the measuring tubes, arrives at the straightening device it strikes under the inclined edge up which it rises until freed therefrom, passing out of the tube and drawn against the selvage edge of the fabric.

In setting the vane, B¹⁷, for the proper measurement account is to be taken of the extension of the lay from the fabric to the feed plate, B', across which a good proportion of the second half of the thread extends. The measuring device is to take up the excess of the material required over and above that which extends from the fabric to the feed plate as aforesaid.

The driving mechanism by which the measuring mechanism is operated is a part of the general driving mechanism and will be described with that. The only difference which exists is that of the timing its operations with reference to the operation of the feed plate, B', and spring jaw, B⁶, that their action is harmonious.

The thread carrier, which has been several times mentioned above, forms the principal feature of the carrying mechanism, A, by which the short lengths above described are laid into the warp of the fabric. This thread carrier is shown in detail at Fig. 17, of drawings. It consists of the body, A', hollowed out in the center to provide the valley, A³, into which the adjusting finger of the controlling mechanism extends. Also it is provided on the ends with the cone-shaped metal ferrules, common to all shuttles, to receive the impact of the picker sticks P and be thereby driven across the lay. Set back from the said ferrules, from the path of the picker-sticks, are the nipper jaws, A⁴,

$A^5$, on both ends of the thread carrier. The jaws, as above-mentioned, are provided to grasp the threads as presented to them and to carry them into the warp. In thus handling these short lengths of thread it is necessary that the jaws of the nippers open and close at the proper instant, and that the latter end of the thread is laid smoothly in position, that is to say completely drawn out to the edge of the selvage. This is accomplished by the movable jaws $A^4$ of the thread carrier being provided, to the rear of their pivot, with a projection,—in this instance a pin, $A^7$, which extends through the body of the thread carrier slightly beyond the face thereof. To operate against the pin, $A^7$, to depress it and thereby open the jaw, $A^4$, there is provided the spring cam, $A^8$, set pivotally on the lay and the cam surface thereof extended into the path of the pin, $A^7$. This cam is maintained in its normal position by the spring, $A^9$, against the shoulder, $A^{10}$. By its construction, and arrangement, it is immovable by the pin $A^7$ when moving toward the feeding mechanism, and thereby compels the jaw, $A^4$, to open until past the cam, while in the movement of the thread carrier in the opposite direction the pin, $A^7$, strikes behind the cam and moves it against the tension of spring, $A^9$, away without opening the jaw. The cam, $A^8$, is so placed that the jaw, $A^4$, is fully opened when the nippers are entering the openings, $B^4$, and $B^5$ of the feeding mechanism, and terminates abruptly when the jaw, $A^5$, has passed behind the thread end, held across the said openings, and the small pin, $A^2$, on the said jaw has passed slightly beyond the said thread. By the cam, $A^8$, terminating thus abruptly, the jaw, $A^4$, is suddenly closed and imprisons the thread to hold the same by the tension of the spring, $A^6$, in its flight to the opposite side of the lay. As the ends of the filling thread lengths are laid in the selvage warp greater care has to be exercised, and consequently slower speed on the part of the thread carrier, so that there shall be no crinkling or knotting of the thread at this point. Also it has been found advisable to introduce the nipper jaws in the openings, $B^4$, and $B^5$, at a reduced speed. For this purpose the controlling mechanism, D, is used. The controlling mechanism herein shown consists essentially of devices to arrest the flight of the thread carrier at a certain point; and of other devices to propel the thread carrier from its arrested position into position to take the thread from the feed plate, B′. The first of these devices consists of a pivoted latch, D′, which extends into the path of the picker stick, presenting a cam surface to its forward stroke, by which the latch is raised to permit the head of the picker stick to pass freely under it in driving the thread carrier. To the head of the picker stick on its return however the latch presents an abrupt shoulder which holds the picker stick in that position to receive the impact of the thread carrier on its return flight to that side of the lay and there arrest its movement. The thrust of this impact is received by the latch, D′, and transferred by it to the pivoted rod, $D^2$, on which it is mounted. The rod, $D^2$, is pivotally mounted on the reed-frame of the lay. The latch, D′ is adjustably secured on the rod, $D^2$, by the set screw, $D^3$, it being possible thereby to regulate the arrested position—or the advanced position—of the thread carrier. The object in thus arresting the progress of the thread carrier is twofold as above mentioned. The main of these objects,—and for the accomplishment of which the adjustment of the latch is provided,— is the desirability above referred to of laying the ends of the lengths in the selvage warp. In the present machine the thread carrier is arrested in position that the rear nipper jaws, or jaws having a grasp on the thread, remain between the warp threads as the same close upon the threads just laid in. As the shed is being completed by the warp, and before entire completion, the thread carrier is advanced to the end of its stroke, and the rear end which has been between the warp threads is withdrawn therefrom, laying in the end of the filling thread smoothly.

To compel the thread ends to pull from the grasp of the nipper jaws evenly, the jaw, $A^5$, is provided with the small pin, $A^2$, over which the thread is compelled to travel in drawing out of the jaws of the thread carrier. The movement of the controlling mechanism is so timed with reference to the warp mechanism of the loom that the shed is completed just as the jaws, $A^4$, $A^5$, are withdrawn, in fact gliding over the tapered ends of the jaws with a considerable tension grasping firmly the filling thread as it leaves the jaws which have been slightly relaxed in the same way and just before the forward jaws are opened to engage a new thread.

That part of the controlling mechanism by which the thread carrier is advanced consists of an arm, $D^4$, which is pivotally mounted on a standard, $D^5$, at the back of the lay. The arm, $D^4$, is formed of sufficient length to extend down into the valley, $A^3$, formed in the body, A′, of the thread carrier, and in sweeping forward to carry the nipper jaws, $A^4$, $A^5$, into the openings, $B^4$, $B^5$ of the feed plate, after which it returns to its normal raised position before the thread carrier starts on its return.

To free the thread carrier, that it may be moved forward, the arm, $D^4$, is provided with an upwardly extended arm, $D^6$, carrying the loop, $D^7$, in which rests the arm, D⁸. The arm, D⁸, is rigidly secured to the latch, D', and as the arm, D⁶, is swung around by the movement of the crank D⁹ the arm, D⁸, and latch, D' are raised, the latter being lifted above the picker-stick and permitting it to pass. This lifting of the latch is accomplished before the end of the arm, D⁴, impinges upon the thread carrier, consequently at that time there is no obstruction to the movement of the thread carrier by the controlling mechanism.

The arm, D⁴, is connected to the driving mechanism by the crank, D⁹ rigidly secured to the arm, D⁴, on the opposite side of the standard, D⁵. The driving mechanism for this arm, D⁴, is timed to produce therein an even oscillation in harmony with the beating of the lay, or flight of the thread carrier, that is to say as the thread carrier reaches the end of the lay in which is located the particular arm, D⁴, that operates on that side, it is swung down and outward moving the thread carrier into position, as above described. By the time it reaches the limit of its outward swing, the thread carrier has been sent to the opposite side of the lay. As the arm on the other side of the lay places the thread carrier in position the arm just described is rotated back to its first position from which it begins to recede as the thread carrier is started toward it. The driving mechanisms, by which these various instrumentalities are operated, are similar in that each is operated by a cam wheel driven by the general driving mechanism of the loom. Each also is provided with a lever pivotally mounted on fulcrum brace rods at the rear of the machine, and each is connected with its particular cam by an anti-friction roller extended into the grooved cam in each of the cam wheels to produce in the outer end of the levers a timed rise and fall. The grooves in the cam wheels however differ in each instance to produce the peculiarity of actions in the particular mechanism to which each is connected, and which have been above described.

The lever, C', the cam wheel, C², the connecting rods, C³, and C⁴, with the bell crank, C⁵, constitute the driving mechanism of the feed plate, B', and by which it is rotated to its several positions as above described. The cam wheel, C², is provided on the face with a convoluted grooved cam, C⁶, in which is set the pin, C⁷, extended from the side of the lever, C', and which is provided with an anti-friction roller. The grooved cam, C⁶, is shaped to produce an upward and downward movement of the end of the lever, C', to raise and lower the connecting rod, C³, and thereby operate the bell crank, C⁵ and rod, C⁴, to throw the crank arm, B¹⁴, outward or inward and rotate the plate, B', to the various positions above described.

That the cam, C², may act with reduced rapidity to produce the various movements required of the feed plate, B', it is mounted on the driving shaft, C⁸, which is geared to the regular cam C⁸⁰ of the ordinary loom by two to one gears, that is to say the cam, C², is rotated completely once to twice of the regular cam shaft; or the feed plate is placed in all its various positions once completely to every four beats of the lay and flights of the thread carrier, the driving mechanism of which is timed with the regular cam shaft. By this means the feed plate, B', successively presents the first and last ends of the short lengths of the filling threads. Mounted on the same shaft, C⁸, is the cam wheel, C⁹, which in conjunction with the lever, C¹², the rod, C¹⁰, lever C¹¹, and pivoted rod, B²¹, constitute the particular driving mechanism for the operation of the measuring rod, B¹⁸. The cam in this wheel is simple but sharp in order that, as explained above, the entire movement of the said measuring rod will be completed in the interval between the first and third positions of the feed plate, B'. The lever, C¹², is pivotally mounted on the fulcrum rod, C¹³, Fig. 2 as is the lever, C', and like it is connected to its cam wheel and similarly extended through the openings, C¹⁴, Fig. 6 in each of the upright rods by which the movement of the levers is communicated to the various mechanisms. In this instance however this motion is communicated from the upright, rod, C¹⁰, by the lever, C¹¹, which is pivotally mounted on the pivotal shaft of the lay and extends laterally beyond the frame of the loom, engaging in the upright rod, C¹⁰, a pin, C¹⁵, by means of a slot, C¹⁶, in itself. At its end it is connected to the lower end of the rod, B²¹, Fig. 1 which is connected to the rod, B¹⁸, of the measuring device. As the shaft, C⁸, is rotated the feeding and measuring devices are operated thereby and in perfect harmony, the same shaft operating both.

The controlling mechanism is provided with its particular driving mechanism, which consists in the cam wheel, C¹⁷, Fig. 6 on the regular cam shaft C⁸⁰, Fig. 6, of the loom, the lever, C¹⁸, fulcrumed on the rod, C¹³, Fig. 2 and connected to its cam wheel as described in the instance of the other two mechanisms; the upright connecting rod, C¹⁹, the bell crank, C²⁰, and connecting rod, C²¹, which reaches outward to engage the crank, D⁹, Fig. 4. The operation of this driving mechanism differs from those described above only in the time of operating, this operating in unison with the lay as described oscillating previous to the flight of the shuttle.

While there have been described in this specification only the attachments as applied to one end of the lay, it will be understood these are duplicated at the other end of the lay, forming in the completed machine two entire sets. These sets differ only in the time of their action which is successive, the set on the one end repeating the actions of the set on the other.

To aid in obtaining a full comprehension of this invention, I have shown at Fig. 19 a diagram of the manner of laying the filling threads in the warp (the warp threads being omitted) which will be found more fully set forth in the patent granted me on this fabric as above mentioned. In this diagram the filling threads will be seen in the form of interwoven loops leading in from both sides, thus the loops, $x$, form the left and the loops, $y$, form the right. The driving mechanism referred to in this connection signifies not the mechanism that propels the thread carrier in its flight from the feeders through the shed of the warp but that operative mechanism only which imparts motion to the mechanism peculiar to this invention and which arrests the flight of the thread carrier and subsequently releases it and imparts to it a supplemental movement to cause it to release one thread and engage another. In the present instance I have made use of the body of an ordinary shuttle and the spring cams $A^8$ Fig. 18 and the controlling and operative mechanisms shown and described to demonstrate the principle and possibilities involved in this method of weaving and to show its adaptability as an attachment to the looms at present in use, but wish not to be understood as limiting myself to these forms of these devices to accomplish the purpose they are here made to serve merely as expedients. In this case I have shown in Fig. 17 a common fly-shuttle with the tongue removed converted into a filling carrier for my purpose by reducing its depth and attaching to it two pairs of nippers of simple construction composed of a light steel bar let into a groove in the back of the shuttle and pinned in position. The two ends of this are formed into two stationary jaws $A^5$ and to this are pivotally mounted the two movable jaws $A^4$ provided with pins $A^2$ near their outward ends. Operative springs $A^6$ by which they are closed and the two push pins $A^7$ by pressure upon which they are opened to release their hold upon one thread and to engage another as they pass the spring-operated cams $A^8$ suitably disposed on the lay are provided.

Having thus described my invention and some of its advantages what I claim and for which I desire Letters Patent is:—

1. In a loom, the combination of a filling carrier provided with a pair of nipper jaws at each end, means for presenting in succession to the jaw at either end the ends of a thread, automatic mechanism for opening the nipper jaws on one side of the loom to seize an end of filling yarn presented thereat and automatic mechanism for opening the jaws at the other side of the loom to release said end, substantially as described.

2. In a loom, the combination of a filling carrier, means for moving said carrier from side to side of the loom, means for presenting at either side of the loom the ends of a thread, means carried by said filling carrier for seizing said ends in succession, and means operated at the opposite side of the loom for causing said filling carrier to twice release in succession ends of alternate threads, substantially as described.

3. In a loom the combination of a filling carrier, means for presenting at the side of the loom the end of a thread, means for measuring off a predetermined length of said thread, means carried by said filling carrier for seizing said end, means for reciprocating the carrier across the loom, means for cutting off the thread so measured and presenting the second end to the filling carrier on its return to the same side of the loom, and means for automatically causing the filling carrier to engage the second end and to carry it across the loom, substantially as described.

4. In a loom, the combination of a pair of shears at each side thereof adapted to cut the filling yarn into lengths, feeding mechanism adapted to hold the ends of such filling thread when severed and successively present them to a filling carrier and a filling carrier adapted to successively transport said ends to the opposite side of the loom to be laid in the warp in the process of weaving, substantially as described.

5. In a loom, the combination of a filling carrier for carrying a thread across the warp, means for momentarily arresting said filling carrier at the close of its flight and subsequently releasing the same and means for moving it on in the same direction to cause it to release a thread so as to leave the end thereof in the selvage and to seize the end of another thread from a feeder, and said feeder for said end, substantially as described.

6. In a loom, the combination of a filling carrier for carrying a thread across the loom, means for feeding a thread to said carrier at the side of the loom, automatic means for causing the carrier to seize the thread so fed, means for moving the carrier across the warp to lay the thread therein, means for arresting the movement of the carrier at the close of its flight, means for subsequently releasing the same, means for moving it on in the same direction to cause it to release the thread so as to leave the end thereof in the selvage, substantially as described.

7. In a loom, the combination of a plate having in its outer or free edge openings across which the thread is passed, means for feeding the thread across said openings, a filling carrier having a device for seizing the thread, means for moving said carrier to cause said device to extend into said openings in succession, and means for moving said carrier across the loom, substantially as described.

8. In a loom, a swinging plate provided with a spring jaw for presenting the thread, in combination with means for severing the thread, and a thread carrier for carrying the thread so presented across the loom, substantially as described.

9. In a loom, a swinging plate provided with a spring jaw for presenting the thread and having its edges curled back to form guides for the thread, in combination with a thread carrier for carrying the thread so presented across the loom, substantially as described.

10. In a loom, a swinging plate having openings and provided with a spring jaw with openings corresponding with the openings in the plate, said plate and jaw being adapted to present the thread, in combination with a thread carrier for carrying the thread so presented across the loom, substantially as described.

11. In a loom, a swinging plate provided with a spring jaw for presenting the thread and having pins for regulating the position of the thread, in combination with a thread carrier for carrying the thread so presented across the loom, substantially as described.

12. In a loom, a swinging plate for presenting a thread, means for successively shifting said plate into three operative positions, in combination with a thread carrier for carrying the thread across the loom, said swinging plate being provided with means for presenting the thread in the first and third positions and for grasping the thread in the second position, said thread carrier being provided with means for seizing the thread, substantially as described.

13. In a loom, a pivoted plate for presenting the thread, and means carried thereby for cutting the thread, in combination with a thread carrier for carrying the thread so presented across the loom, substantially as described.

14. In a loom, a pivoted plate for presenting the thread, a stationary blade carried on said plate, and a pivoted blade also carried on said plate for cutting the thread, in combination with a thread carrier for carrying the thread so cut across the loom, substantially as described.

15. In a loom, a swinging plate, a spring jaw thereon for presenting the thread, a pivoted blade for cutting the thread, said blade engaging said jaw to operate the same, in combination with the thread carrier for carrying the thread across the loom, substantially as described.

16. In a loom, a measuring instrument for the thread comprising two oppositely slitted tubes, and a measuring device passing down between said tubes to draw the thread thereinto, in combination with means for severing the thread so measured and laying it in the warp, substantially as described.

17. In a loom, the combination with a measuring device comprising two oppositely slitted tubes, a vane with a notch on its under side moving between said tubes to draw the thread thereinto, in combination with means for severing the thread so measured, and means for laying it in the warp, substantially as described.

18. In a loom, the combination of a tube, a rod sliding therein, an extension from said rod, means for presenting a thread to said extension, to be measured by the movement thereof, means for severing the thread so measured, and means for laying it in the warp, substantially as described.

19. In a loom, the combination of a tube, a rod sliding therein, an extension from said rod, slitted tubes between which said extension slides to measure the thread, means for severing the thread so measured and means for laying the thread in the warp, substantially as described.

20. In a loom, the combination of a tube, a rod sliding therein, an extension from said rod, slitted tubes between which said extension slides to measure the thread, means for varying the extent of the movement of the rod, means for severing the thread so measured and means for laying the thread in the warp, substantially as described.

21. In a loom, the combination of a tube, a rod sliding therein, an extension from said rod, slitted tubes between which said extension slides to measure the thread, a straightening device for straightening the thread so measured, means for severing the thread so measured and means for laying the thread in the warp, substantially as described.

22. In a loom, the combination of a tube, a rod sliding therein, an extension from said rod, slitted tubes between which said extension slides to measure the thread, a curled piece of metal in one of the tubes for straightening the thread so measured, means for severing the thread so measured and means for laying the thread in the warp, substantially as described.

23. In a loom, the combination of a tube, a rod sliding therein, an extension from said rod, slitted tubes between which said extension slides to measure the thread, a piece of metal having an inclined edge to engage the thread and straighten the same, means for severing the thread so measured and means for laying the thread in the warp, substantially as described.

24. In combination with a loom, a pair of feeders placed at each end of the lay and provided with cutting and holding devices adapted to sever the filling yarns and hold the two ends of the said severed filling thread and successively present them to a filling carrier provided with nipper jaws adapted to seize the said filling threads by their ends as presented and successively carry them by its reciprocating movements in and across the shed of the warp in the process of weaving a fabric, substantially as described.

25. In a loom, the combination of a thread carrier, a device to arrest the flight of the thread carrier at a certain point, a pivoted feed plate for presenting the thread to the thread carrier and means for propelling the thread carrier from its arrested position into position to take the thread from said feed plate, substantially as described.

26. In a loom, the combination, with a picker stick, of a pivoted latch extending in the path of the picker stick having a cam surface presented to the forward stroke of the picker stick, whereby the latch is raised to permit the head of the picker stick to pass freely thereunder in its forward stroke, said latch presenting an abrupt shoulder to the head of the picker stick on its return movement, a thread carrier, means for presenting thread to said thread carrier, and means carried by said thread carrier for seizing the thread so presented, substantially as described.

27. In a loom, the combination of a pivoted rod, the latch supported thereon in the path of the picker stick, said latch permitting the picker stick to pass underneath in its forward stroke while arresting its return movement, and means for raising the latch to permit the picker stick to return to its original position, substantially as described.

28. In a loom, the combination of a thread carrier, means for presenting a thread thereto, a device carried by said thread carrier for seizing the thread so presented, means for moving the thread carrier across the loom, means for arresting the thread carrier when the end of the thread so grasped has been brought to the edge of the warp, means for withdrawing said grasping device from said thread and leaving said end in said edge of the warp, and means for imparting tension to the thread when said end leaves said grasping device, substantially as described.

29. In a loom, the combination of a thread carrier, means for presenting a thread thereto, a device carried by said thread carrier for seizing the thread so presented, means for moving the thread carrier across the loom, means for arresting the thread carrier when the end of the thread so grasped has been brought to the edge of the warp, means for withdrawing said grasping device from said thread and leaving said end in said edge of the warp, and means for slightly relaxing said grasping device to permit the end of the thread to be withdrawn therefrom, substantially as described.

30. In a loom, the combination of a thread carrier, means for presenting a thread thereto, means for moving the carrier across the loom, means for arresting said carrier, and means for advancing the same after it is arrested, said latter means comprising a pivoted arm engaging said thread carrier, and means for swinging said arm to advance the same, substantially as described.

31. In a loom, the combination of a thread carrier, means for presenting the thread thereto, means for moving the thread carrier across the loom, means for arresting said thread carrier, means for freeing said carrier from said arresting means, and means for advancing said carrier after being so freed, substantially as described.

32. In a loom, the combination of a thread carrier, means for moving the same across the loom, a latch for arresting the same, a pivoted rod supporting said latch, a swinging arm for raising said rod, and an arm swinging with the first arm for advancing the thread carrier after said rod has been so raised, substantially as described.

33. In a loom the combination with two sets of feeding mechanisms for the filling thread to form the same into short lengths, and successively present the two ends of the said lengths to a filling carrier to be carried across the warp threads, said feeding mechanism consisting of separate holding jaws to retain the two ends of the severed thread, and pivotally mounted one on each end of the lay so as to be rotated to present the said holding jaws alternately to the same position, of a thread carrier adapted to engage the said ends as presented, and convey them across the warp, and a driving mechanism for operating the said feeding mechanism and thread carrier in harmony, substantially as described.

34. In a loom the combination with two sets of feeding mechanisms for the filling thread, one located at each end of the lay, and each adapted to form the filling thread into short lengths and alternately present the two ends thereof to be carried across the warp, consisting of separate holding jaws to retain the two ends of the separate lengths of thread, pivotally mounted on the lay to be rotated to present the said ends alternately in the same position, and provided with a cutter mounted between the said jaws, adapted to cut the thread when the said jaw is rotated to a pre-determined position, of a thread carrier adapted to engage the said ends as presented by each set and convey them across the warp, and mechanism to operate the said feeding mechanism and thread carrier in harmony, to cause the two sets of feeding mechanism to present the ends of the said short lengths of filling thread successively with reference to each other, substantially as described.

35. In a loom the combination with two sets of feeding mechanisms for the filling thread adapted to take the thread from an outside source, measure it in suitable lengths and sever the lengths from the said source, and alternately present the two ends thereof to be carried across the warp, consisting of separate holding jaws, to retain the two ends of the said lengths of thread, pivotally mounted on the lay to be rotated to present the said ends alternately to the same position, and provided with a measuring device having a finger to strike over and upon the said thread to draw it to the desired length prior to cutting the same, and a cutter to sever the thread after the same has been so measured, of a thread carrier adapted to engage the said ends as presented, and convey them across the warp; and a mechanism to operate the said feeding mechanism and thread carrier in harmony, substantially as described.

36. In a loom the combination with two sets of feeding mechanism for the filling thread, adapted to take the thread from an outside source, measure it into suitable lengths, and sever the lengths from the source when so measured, and present the two ends of the said lengths to be carried across the warp, consisting of separate holding jaws to retain the two ends of the separate lengths of thread, pivotally mounted on the lay to be rotated to present the said ends alternately to the same position, a measuring device adapted to operate over and upon the said thread as the same is being drawn through the said holding jaws to draw the thread into desired lengths, and a cutter mounted on the said jaws, to cut the thread when the said jaw is moved to a pre-determined position, of a thread carrier adapted to engage the ends of the said lengths as presented, and convey them across the warp, and mechanism to operate the said feeding mechanism and the secondary movement of the thread carrier in harmony, substantially as described.

37. In a loom a feeding mechanism to present the filling thread from a source outside the loom to a carrying mechanism consisting of a device adapted to measure the said filling thread into suitable lengths, a device to sever the lengths from the supply of thread when so measured, and a device to engage and present successively the two ends of the said lengths to the carrying mechanism to be laid in the warp threads of the fabric; in combination with the said carrying mechanism adapted to engage the two ends of the said lengths as presented by the said feeding mechanism and carry them across the warp, substantially as described.

38. In a loom a feeding mechanism to present to a carrying mechanism the filling thread from a source outside the loom, consisting of a plate having a jaw to close on and grasp the said thread and provided with delivery openings in its edge across which the thread is held, of a cutting device to sever the thread between the said delivery openings, and a driving mechanism to cause the feed plate to present the said delivery openings alternately into the path of the said carrying mechanism; in combination with said carrying mechanism adapted to engage the two ends of the said lengths as presented by the said feeding mechanism and carry them across the warp, substantially as described.

39. In a loom a feeding mechanism to deliver to a carrying mechanism the filling thread from a source outside the loom, which consists of a plate mounted pivotally on the lay of the loom and having a jaw to close upon and hold the said thread in the path of the nippers of the said carrying mechanism, of a cutting device having a movable blade adapted to close on and sever the thread while in the grasp of the said feed plate and holding jaw, and a driving mechanism to cause the feed plate to present the said thread alternately on either side of the said cutting device; in combination with a carrying mechanism consisting of a thread carrier adapted to engage the two ends of the said thread successively, and mechanism to drive the thread carrier from side to side of the lay across the warp of the fabric, substantially as described.

40. In a loom a feeding mechanism to deliver to a carrying mechanism the filling thread from a source outside the loom, which consists of a plate pivotally mounted on the lay of the loom and having openings in the forward edge across which the thread is held, a spring jaw mounted on said plate and adapted to close on and hold the thread against said plate, a device to separate the said jaw and plate for a predetermined time in its operation to release the thread while the ends are carried across the warp, a cutting device to sever the thread from the supply, while the said jaw is closed on the said plate, and a driving mechanism to cause the feed plate to present the said thread alternately on either side of the said cutting device; in combination with a carrying mechanism consisting of a thread carrier adapted to engage the two ends of the said thread, and a driving mechanism to propel the thread carrier from side to side across the warp of the fabric, substantially as described.

41. In a loom, a feeding mechanism to deliver to a carrying mechanism the filling thread from a source outside the loom, which consists of a plate pivotally mounted on the ends of the lay of the loom, and having two openings in the forward edge, a spring jaw mounted on the said plate and adapted to close on and hold the thread against the said plate, and having two openings in its forward edge to correspond to those in the plate, a cutting shear blade pivotally mounted in said plate between the said openings and provided with an arm by which it can be opened and closed, a bent rod engaging the said arm of the shear to act as a cam to throw the said arm to open and close the said shear blade, and operating mechanism to rotate the plate and spring jaw to present the openings in the same to the jaws of the filling carrier and to rotate the plate to an upright position between the presentation of the upper and lower openings; in combination with a thread carrier adapted to engage the two ends successively of a thread when so presented and mechanism to move the thread carrier from side to side across the warp of the fabric, substantially as described.

42. In a loom, a feeding mechanism to deliver to a carrying mechanism the filling thread from a source outside the loom, which consists of a plate pivotally mounted on the lay of the loom, and having openings in the forward edge across which the thread is held, a spring jaw mounted on said plate and adapted to close on and hold the thread against the plate, a cutting device to sever the thread from the supply while the said jaw is closed on the thread, and operating mechanism to rotate the said plate to present the said thread alternately on either side the said cutting device; in combination with a carrying mechanism consisting of a thread carrier adapted to engage the two ends of the thread successively when so presented, and a controlling mechanism to arrest the flight of the said carrier before reaching the end of its stroke and to move it slowly after so arresting it to the end of its stroke, substantially as described.

43. A thread feeder comprising a reciprocative head having mouths, thread holders or springs adjacent to said mouths, cutters carried by said head to move therewith and acting upon said holders or springs to operate them, means for operating said cutters, and means for reciprocating the head, substantially as described.

44. A thread feeder comprising a reciprocative head having mouths, means for moving the head, holders or springs carried by said head on the exterior thereof and adjacent to said mouths, cutters carried by said head and having a movable member operating on said holders to open them, and means for operating said cutters, substantially as described.

45. A thread feeder comprising a reciprocative head having mouths, means for moving the head, holders or springs carried by said head adjacent to said mouths and normally pressing against said feeder, cutters carried by said head between said mouths acting on said holders, and means for operating said cutters, substantially as described.

46. A thread feeder comprising a head having mouths, holders or springs carried by said head adjacent to said mouths, a pin or rod connecting said holders or springs, cutters carried by said head having a movable member adapted to operate on said rod to move said holders or springs and means for operating the movable member of said cutters, substantially as described.

47. In combination, the shuttle with its box, the feed device comprising the movable head, means for moving the head, the movable holding means for the weft thread on the head, the cutter, and means for moving the same, said cutter controlling the action of the holding means, substantially as described.

48. In combination, the shuttle, the feed device, comprising the head, having the open mouths, the spring holders for the weft thread adjacent to the said mouths, the cutter arranged between the holders, the rod connecting the spring holders, and the cam for operating the cutter, said cutter being arranged to operate the spring holder, substantially as described.

49. The combination of a reciprocative head, thread holders carried thereby, means for reciprocating the head, a frame having means to guide said head, thread cutters carried by said head having a movable member, a cam carried by said frame to act with said movable member, said cam having one face arranged to open the cutters, the other face of said cam being arranged to close the cutters, and springs to act on said movable member, substantially as described.

50. The combination of a reciprocative head, thread holders or springs carried thereby, a pin or rod connecting said holders, cutters carried by said head having a movable member, the movable member being arranged to act on said pin or rod to operate said holders, a frame having means for guiding said head, a cam to act on the movable cutter, said cam having one face adapted to open said cutters and move the holders outwardly, the other side of the cam being arranged to close the cutters and permit the holders to close against the feeder, substantially as described.

51. In combination, in a loom the shuttle, its box, the measurer, weft supply means and an adjustable stop to release the thread therefrom when the requisite length of thread has been drawn, said measurer being located between the shuttle and the weft supply means, substantially as described.

52. In combination, the shuttle, the lay, the feed head carrying the guide, the holders for the weft ends, the measurer, the cutter, and means for reciprocating the feed head and measurer in opposite directions, substantially as described.

53. In combination, the shuttle, the lay, the reciprocative head having the holders for the weft ends and the cutters for the thread, means for reciprocating the head the measurer with operating means therefor and the cam, for controlling the cutter and holders having one part to hold the same open while the measurer is drawing the thread, substantially as described.

54. In combination, the lay, the shuttle, devices outside of the shuttle for supplying the weft thread, a reciprocating feed means comprising holders and cutters, a measuring device and means for operating the feed and cutter means to release the thread therefrom during the reciprocation of the head and the movement of the measurer, the said parts being arranged with the shuttle operating on one side of the measurer and the cutting and feeding devices operating on the other side of the measurer, substantially as described.

55. In combination the shuttle having nippers to engage and release the weft thread, devices outside of the shuttle for supplying the weft thread, means for measuring the length of weft thread while the end of said weft is held by the shuttle within the web and means for opening the nippers to release the weft thread, substantially as described.

56. In combination, the lay, the shuttle thereon having nippers, means for feeding the weft thread, devices outside of the shuttle for supplying the weft thread means for stopping the shuttle before it reaches the end of its course and means for giving the shuttle an additional movement to complete its course, with means for opening the nippers, substantially as described.

57. In combination, the lay, the shuttle, the picker-stick for arresting the shuttle, the stop arresting the picker-stick, means for feeding the weft thread to the nippers of the shuttle, means for operating the nippers and means for giving the shuttle with the picker-stick and stop an additional movement to complete the full course of the shuttle, substantially as described.

58. In combination, the lay, the shuttle having nippers at each end and feed devices for the weft thread at each end of the feed lay to feed the weft into the shuttle, means for arresting the shuttle to hold the weft thread within the web, means for measuring the weft thread at the opposite edge of the web and means for opening the nippers and pushing the shuttle to the end of its course to release the weft just laid in and to engage a new weft thread, substantially as described.

59. In combination, the lay, the shuttle thereon having nippers at each end, a pair of shuttle openers to open the nippers approximately simultaneously, a feed device at the end of the lay for the weft thread and a pusher for giving the shuttle its final movement, substantially as described.

60. In combination, the lay, the shuttle thereon having nippers at each end, devices for supplying weft thread at each end of the lay, a measuring and cutting device at each end of the lay to measure off independent loop lengths and cut them, a feed device adapted to present first one end of the loop length to the shuttle and then the other on successive reciprocations of the shuttle, a pair of shuttle openers at each end of the lay adapted to open the nippers, a picker-stick and a pusher at each end of the lay with means for operating the same to give the shuttle its final movement, substantially as described.

61. In combination, the lay, the shuttle thereon having nippers at each end, means for measuring, cutting and feeding independent lengths at each end of the lay, the shuttle openers at each end of the lay, a pusher at each end of the lay, a cam shaft with connections therefrom to the measuring, cutting and feeding mechanism, and connections from the cam shaft to the shuttle opener and pusher, substantially as described.

62. In combination with the lay and its shuttle, having nippers, the measuring, cutting and feeding device for the weft thread, the shuttle opening device and the pusher device, means for supporting the same on the end of the lay, said measuring device being located between the feeding device and the shuttle, and means for operating the feeding device to present first one end and then the other end of the weft thread to the shuttle, substantially as described.

63. In combination with the lay and its shuttle having nippers, a reciprocative feed device carried by the lay, means for reciprocating the feed device, a cutting device moving with the feed device, means for operating the cutting device in the movement of the feed device, a measuring device located between the feeding device and the shuttle, said measuring device being carried by the lay, shuttle opening and pusher devices carried by the lay and operating means therefor, substantially as described.

64. In combination, a shuttle, a stop to engage the shuttle, a picker-stick, a stop therefor and operative connections adapted to give the shuttle a final additional movement, the said stops and picker stick partaking of said movement, substantially as described.

65. In combination, a picker-stick, a stop therefor, a shuttle adapted to come in contact with the picker-stick, a stop to prevent the rebound of the shuttle, means for moving the stop to push the shuttle to the limit of its movement while in contact with the picker stick, and means for releasing the shuttle from its stop, substantially as described.

66. In combination, a lay, a shuttle having nippers, thread feeding devices, openers arranged at the ends of the shuttle race to open the shuttle nippers, means for arresting the shuttle and means for moving the shuttle from its arrested position to make contact with the shuttle openers, substantially as described.

67. The combination of a lay, feeding and cutting devices carried by the latter, thread measuring devices, means for moving the feeding devices to present first one end and then the other end of a measured loop in line with the shuttle, a shuttle pusher carried by said lay and having a stop for the shuttle, and means for operating the same for positively moving the shuttle to the feeding device, substantially as described.

68. The combination of a lay, a shuttle having nippers thereon, thread feeding and cutting devices carried by the lay, means for moving said feeding devices to present first one end and then the other end to a thread in the path of the shuttle, means for stopping and positively moving a shuttle to the feeding tension, and shuttle openers adapted to operate nippers on the shuttle to release one thread and to engage another, substantially as described.

69. A shuttle having nippers in combination with a shuttle opener comprising a rocking arm and means for moving it into and out of the line of movement of the shuttle to operate the nippers thereof, during the movement of the shuttle along the shuttle race, substantially as described.

70. In combination, a shuttle having nippers, a shuttle box, a shuttle opener comprising a rocking arm extending through a slot in said shuttle-box and means for operating said arm, into and out of the line of movement of the shuttle, said shuttle moving in relation to the openers so that the nippers will be operated, substantially as described.

71. In combination, the lay, the shuttle thereon having nippers, the weft measuring, cutting and feeding devices at the ends of the lay, the shuttle openers, the shuttle pushing devices, the cam shaft having cams thereon, the rods or shafts extending along the lay for operating the parts at the ends thereof and the upwardly extending rods between the same and the cams, substantially as described.

In testimony whereof, I have hereunto set my hand this 23rd day of June 1896.

ROBERT H. H. HUNT.

Witnesses:
E. F. MURDOCK,
CHAS. E. KELLY.